United States Patent [19]

Wickstrom

[11] Patent Number: 5,537,942
[45] Date of Patent: Jul. 23, 1996

[54] APPARATUS FOR SIMULTANEOUSLY SEEDING AND FERTILIZING AGRICULTURAL CROPS

[75] Inventor: Victor A. Wickstrom, Tompkins, Canada

[73] Assignee: Swede Industries Inc., Regina, Canada

[21] Appl. No.: 187,053

[22] Filed: Jan. 27, 1994

[30]     Foreign Application Priority Data

May 27, 1993 [CA] Canada ................................. 2105050

[51] Int. Cl.$^6$ ................................................... A01C 5/08
[52] U.S. Cl. ........................... 111/188; 111/186; 111/129
[58] Field of Search ................................. 111/120, 156, 111/186–188, 129

[56]                References Cited

U.S. PATENT DOCUMENTS

|   |   |   |
|---|---|---|
| 363,109 | 5/1887 | Bullups . |
| 2,515,368 | 7/1950 | Brunner . |
| 2,623,483 | 12/1952 | Stevenson . |
| 2,684,617 | 7/1954 | Johnston . |
| 3,120,873 | 2/1964 | Bledsoe . |
| 3,605,657 | 9/1971 | Brannon ................................. 111/188 |
| 3,854,429 | 12/1974 | Blair ........................................ 111/188 |
| 3,919,951 | 11/1975 | Williams et al. . |
| 3,959,901 | 6/1976 | Klett . |
| 4,033,271 | 7/1977 | Williams et al. . |
| 4,129,082 | 12/1978 | Betulius . |
| 4,185,699 | 1/1980 | Lewison . |
| 4,388,878 | 7/1983 | Demzin . |
| 4,417,530 | 11/1983 | Kopecky . |
| 4,446,927 | 5/1984 | Robertson . |
| 4,565,141 | 1/1986 | Kopecky . |
| 4,580,507 | 4/1986 | Dreyer et al. . |
| 4,607,581 | 8/1986 | Kopecky ................................. 111/187 |
| 4,633,791 | 1/1987 | Lindstrom et al. . |
| 4,638,748 | 1/1987 | Kopecky . |
| 4,653,412 | 3/1987 | Clarke ..................................... 111/187 |
| 4,721,047 | 1/1988 | Stauch . |
| 4,762,075 | 8/1988 | Halford . |
| 4,765,263 | 8/1988 | Wilkins . |
| 4,770,112 | 9/1988 | Neumeyer . |
| 4,782,774 | 11/1988 | Clarke . |
| 4,798,151 | 1/1989 | Rodriques, Jr. . |
| 4,926,767 | 5/1990 | Thomas ................................... 111/187 |
| 5,140,917 | 8/1992 | Swanson . |

FOREIGN PATENT DOCUMENTS

|   |   |   |   |
|---|---|---|---|
| 1020017 | 11/1977 | Canada . |   |
| 1080554 | 7/1980 | Canada . |   |
| 1211992 | 9/1986 | Canada . |   |
| 1275864 | 10/1986 | Canada . |   |
| 1231868 | 1/1988 | Canada . |   |
| 1237948 | 6/1988 | Canada . |   |
| 1276839 | 8/1988 | Canada . |   |
| 1242115 | 9/1988 | Canada . |   |
| 1257146 | 7/1989 | Canada . |   |
| 1268080 | 4/1990 | Canada . |   |
| 1267325 | 4/1990 | Canada . |   |
| 1268379 | 5/1990 | Canada . |   |
| 1271668 | 7/1990 | Canada . |   |
| 85685 | 8/1965 | France ................................. 111/188 |   |
| 397149 | 9/1973 | U.S.S.R. ............................. 111/186 |   |
| 952131 | 8/1982 | U.S.S.R. ............................. 111/187 |   |
| 1301334 | 4/1987 | U.S.S.R. ............................. 111/187 |   |

*Primary Examiner*—Spencer K. Warnick, IV
*Attorney, Agent, or Firm*—Anthony R. Lambert

[57]                ABSTRACT

An apparatus for simultaneously seeding and fertilizing agricultural crops is described which includes a seeding blade having opposed sides, a knife-like leading edge, a trailing edge and a bottom edge. A seed conduit is disposed along the trailing edge of the seeding blade and has an outlet adjacent the bottom edge. A fertilizer blade depends from one of the opposed sides of the seeding blade adjacent the bottom edge. The fertilizer blade is angled downwardly and outwardly from the seeding blade at an angle of between 10 and 40 degrees. The fertilizer blade has a knife-like leading edge, a trailing edge and a bottom edge. The trailing edge of the fertilizer blade is disposed beside and behind the trailing edge of the seeding blade. A fertilizer conduit is disposed along the trailing edge of the fertilizer blade and has an outlet adjacent the bottom edge. In operation seed passes through the seed conduit into the seed channel formed in undisturbed soil and fertilizer subsequently passes through the fertilizer conduit into the fertilizer channel formed to the side and below the seed channel thereby maintaining a spacial separation between the seed and the fertilizer.

2 Claims, 2 Drawing Sheets

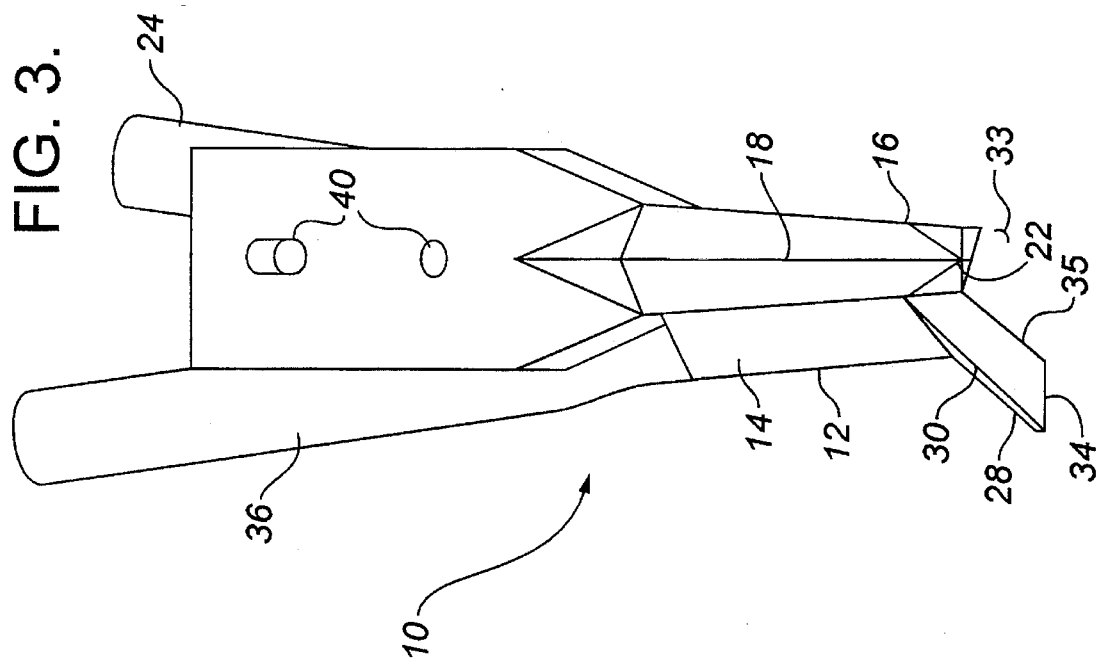
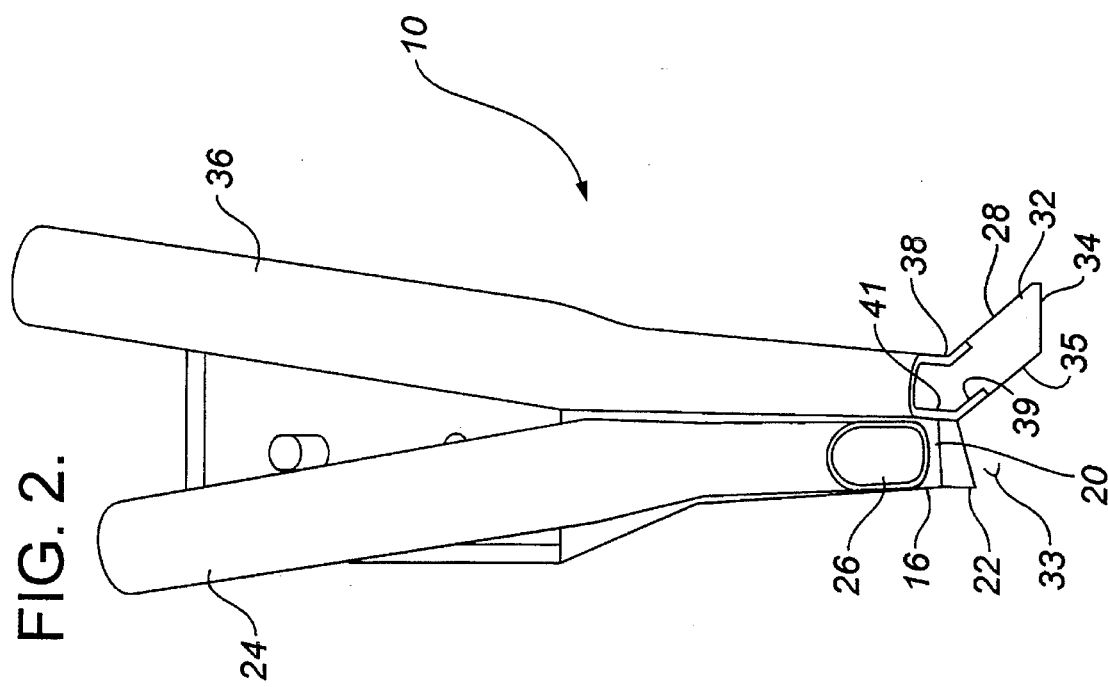

APPARATUS FOR SIMULTANEOUSLY SEEDING AND FERTILIZING AGRICULTURAL CROPS

The present invention relates to an apparatus for simultaneously seeding and fertilizing agricultural crops.

BACKGROUND OF THE INVENTION

It is viewed as desirable to simultaneously fertilize seed as it is planted. The preferred positioning of the fertilizer is below and to the side of the seed; an operation called "side banding".

A number of apparatus have been developed for seeding and fertilizing agricultural crops. An example of such an apparatus is U.S. Pat. No. 4,638,748 which issued to Kopecky in 1987. The Kopecky reference discloses a single furrow opening shank which has seed outlets and fertilizer outlets which are spaced.

It is generally considered desirable to plant seeds on a firm seed bed of undisturbed soil. A firm seed bed is better at retaining moisture and aids germination. The Kopecky reference unavoidably disturbs the soil in the intended seed bed.

SUMMARY OF THE INVENTION

What is required is an apparatus for simultaneously seeding and fertilizing agricultural crops which plants the seed on a firm seed bed of undisturbed soil.

According to the present invention there is provided an apparatus for simultaneously seeding and fertilizing agricultural crops, which includes a seeding blade having opposed sides, a knife-like leading edge, a trailing edge and a bottom edge. A seed conduit is disposed along the trailing edge of the seeding blade and has an outlet adjacent the bottom edge. A fertilizer blade depends from one of the opposed sides of the seeding blade adjacent the bottom edge. The fertilizer blade is angled downwardly and outwardly from the seeding blade at an angle of between 10 and 40 degrees. The fertilizer blade has a knife-like leading edge, a trailing edge and a bottom edge. The trailing edge of the fertilizer blade is disposed beside and behind the trailing edge of the seeding blade. A fertilizer conduit is disposed along the trailing edge of the fertilizer blade and has an outlet adjacent the bottom edge. In operation seed passes through the seed conduit into the seed channel formed in undisturbed soil and fertilizer subsequently passes through the fertilizer conduit into the fertilizer channel formed to the side and below the seed channel thereby maintaining a spacial separation between the seed and the fertilizer. Means is provided for mounting the seeding blade to agricultural machinery.

The apparatus, as described above, places the seed on a firm and undisturbed seed bed. In addition, the apparatus addresses other problems commonly encountered. The placement of fertilizer and seed in proximity to one another has a tendency to "burn" the seed. The apparatus, as described above, maintains a spacial separation between seed and fertilizer. This spacial separation is easier to maintain with the firm and undisturbed seed bed and there is not an intermixing of the soil. The potential for plugging is reduced as the seed conduit is sheltered by the seeding blade and the fertilizer conduit is sheltered by the fertilizer blade.

With development of zero till seeding, the ability to seed into high trash or soil cover conditions is now required. In so doing, a process known as "hair pinning" is encountered in which straw and debris on the soil surface bind around the seeding assembly so as to plug delivery tubes or eliminate effective seed and fertilizer separation. The apparatus, as described above, does not have a surface upon which straw and debris may catch, which reduces or eliminates hair pinning which would disturb the seed bed.

BRIEF DESCRIPTION OF THE DRAWINGS

These and other features of the invention will become more apparent from the following description in which reference is made to the appended drawings, wherein:

FIG. 2 is a rear elevation view of the apparatus illustrated in FIG. 1.

FIG. 3 is front elevation view of the apparatus illustrated in FIG. 1.

DETAILED DESCRIPTION OF THE PREFERRED EMBODIMENT

Figure 1:
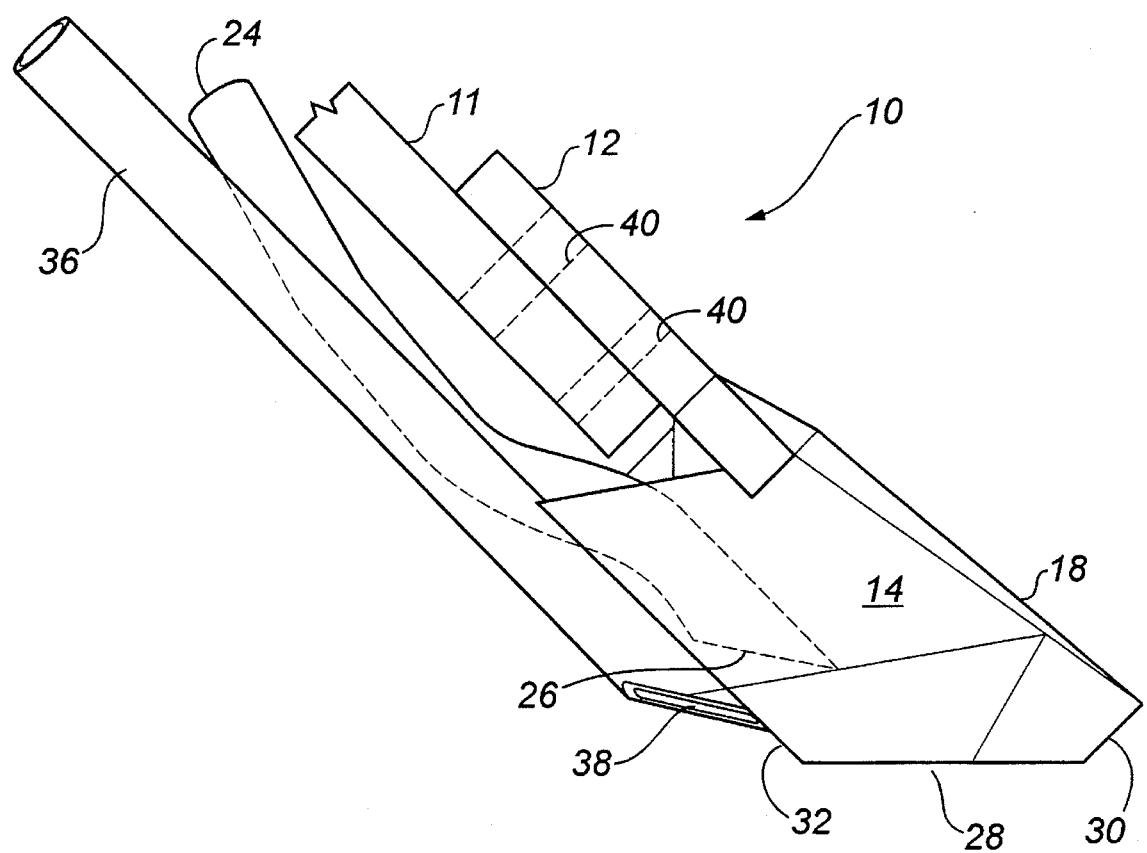
FIG. 1 is a side elevation view of an apparatus for simultaneously seeding and fertilizing agricultural crops constructed in accordance with the teachings of the present invention.

The preferred embodiment, an apparatus for simultaneously seeding and fertilizing agricultural crops generally identified by reference numeral 10, will now be described with reference to FIG. 1 through 3.

Apparatus 10 includes a seeding blade 12 having; a first opposed side 14, a second opposed side 16, a knife-like leading edge 18, a trailing edge 20 and a bottom edge 22. A seed conduit 24 is disposed along trailing edge 20 of seeding blade 12. Seed conduit 24 has an outlet 26 adjacent bottom edge 22. A fertilizer blade 28 depends from opposed side 14 of seeding blade 12 adjacent bottom edge 22. Fertilizer blade 28 has a knife-like leading edge 30, a trailing edge 32, and a bottom edge 34. It is preferred that seeding blade 12 and fertilizer blade 28 be welded together to form an integral unit, however, for ease of assembly seeding blade 12 and fertilizer blade 28 may be made as separate components which are secured together by bolts. Fertilizer blade 28 is angled downwardly and outwardly from seeding blade 12 at an angle of between 10 and 40 degrees. Trailing edge 32 of fertilizer blade 28 is disposed beside and behind trailing edge 20 of seeding blade 12. A fertilizer conduit 36 is disposed along trailing edge 32 of fertilizer blade 28 and has an outlet 38 adjacent bottom edge 34. In operation seed passes through seed conduit 24 into a "V" shaped seed channel (not shown) formed in undisturbed soil and fertilizer subsequently passes through fertilizer conduit 36 into a fertilizer channel (not shown) formed to the side and below the seed channel thereby maintaining a spacial separation between the seed and the fertilizer. A plurality of bolt receiving openings 40 are provided for mounting seeding blade 12 to a mounting assembly 11 of an agricultural implement. Referring particularly to FIG. 2, outlet 38 of fertilizer conduit 36 is angularly bevelled to direct fertilizer into the fertilizer channel formed by fertilizer blade 28. Referring particularly to FIG. 3 opposed side 14 of seeding blade 12 from which fertilizer blade 28 depends is angled outwardly from leading edge 18 of seeding blade 12 to trailing edge 32 of fertilizer blade 28.

The use and operation of apparatus 10 will now be described with reference to FIGS. 1 through 3. Referring now to FIG. 1, seeding blade 12 is intended for attachment to a conventional earth working or seeding agricultural implement such as a hoe drill, air drill or air seeder carrying a separate supply of seed and fertilizer (not shown). Seeding blade 12 is secured to mounting assembly 11 of the agricultural implement by means of bolts (not shown) extended through bolt receiving openings 40. Referring to FIGS. 2 and 3, seeding blade 12 and fertilizer blade 28 create two soil openings in the ground, which at the bottom most area of which are created the seed channel and the fertilizer channel, respectively. Trailing edge 32 of fertilizer blade 28 to which fertilizer conduit 36 is appended is to the rear and below trailing edge 20 of seeding blade 12 to which seed conduit 24 is appended, in addition to being laterally offset therefrom. This leaves an open soil flow path 33 adjacent side 16 of seeding blade 12 between seed conduit 24 and trailing edge 32 of fertilizer blade 28 whereby soil passes behind seed conduit 24 and communicates with underside 35 of fertilizer blade 28, thereby covering seed that has passed through seed conduit 24 prior to application of fertilizer through fertilizer conduit 36. Referring to FIG. 3, fertilizer blade 28 is angled downwardly and outwardly from seeding blade 12 at an angle of between 10 and 40 degrees to create a spatial separation between seed and fertilizer. Side 14 of seeding blade 12 from which fertilizer blade 28 depends is angled outwardly from leading edge 18 of seeding blade 12 toward trailing 32 of fertilizer blade 28 so as to minimize soil fracturing into the seed channel created by seeding blade 12, which would adversely affect seed bed quality.

Referring to FIG. 2, seed conduit 24 carries seed from a supply (not shown) to the seed channel created by leading edge 18 of seeding blade 12 as it moves forward. Seed conduit 24 is positioned so as to prevent displaced soil from leading edge 30 of fertilizer blade 28 from plugging outlet 26. Fertilizer conduit 36 carries fertilizer from a supply (not shown) to the fertilizer channel created by leading edge 30 of fertilizer blade 28 as it moves through the soil. The conduits 24 and 36 place seed and fertilizer, respectively, at the trailing edge 20 and 32 of the respective blades 12 and 28. The use of conventional trailing packers assists in ensuring proper seed bed preparation and fertilizer placement. With the location of leading edge 18 and 30 of blades 12 and 28 and the location of conduits 24 and 36 along trailing edges 20 and 32, there is no point at which fertilizer can be placed above the seed bed.

As shown in FIG. 3, leading edges 18 and 30 of blades 12 and 28 act to cut the soil and direct the soil laterally as apparatus 10 moves forward. Seeding blade 18 is angled downward on its bottom edge 22 so as to create a slight "V" shape to the seed channel in the soil for the seed to settle into that is also protected from fertilizer by the resulting soil ridge.

Referring to FIG. 2, the angularly bevelled outlet 38 of fertilizer conduit 36 direct the fertilizer to the bottom-most area of the fertilizer channel created by fertilizer blade 28.

Various modifications such as size, shape and arrangement of components may be made without departing from the spirit and scope of the invention. The above disclosure shall be interpreted as illustrative only and limited only by the scope of the invention as defined in the following claims.

The embodiments of the invention in which an exclusive property or privilege is claimed are defined as follows:

1. An apparatus for simultaneously seeding and fertilizing agricultural crops, comprising:

a. a seeding blade having a first side, a second side, a knife-like leading edge, a trailing edge and a bottom edge;

b. a seed conduit disposed along the trailing edge of the seeding blade and having an outlet adjacent the bottom edge, the bottom edge of the seeding blade extending at a constant angle from the leading edge of the seeding blade to the seed conduit;

c. a fertilizer blade depending from the first side of the seeding blade adjacent the bottom edge, the fertilizer blade being angled downwardly and outwardly from the first side of the seeding blade at an angle of between 10 and 40 degrees, the fertilizer blade having a trailing edge, a bottom edge and a knife-like leading edge that converges at a constant angle with the first side of the seeding blade immediately adjacent the knife-like leading edge, the trailing edge of the fertilizer blade being disposed beside and behind the seed conduit d. a fertilizer conduit disposed along the trailing edge of the fertilizer blade and having an outlet adjacent the bottom edge, such that in operation seed passes through the seed conduit into a seed channel formed in undisturbed soil by the seeding blade and fertilizer subsequently passes through the fertilizer conduit into a fertilizer channel formed to the side and below the seed channel by the fertilizer blade thereby maintaining a spacial separation between the seed and the fertilizer, the outlet of the fertilizer conduit having a rearward opening with an angularly bent edge, thereby deflecting fertilizer along the trailing edge, toward the bottom edge of the fertilizer blade and into the fertilizer channel; and e. means for mounting the seeding blade to agricultural machinery.

2. The apparatus for simultaneously seeding and fertilizing agricultural crops as defined in claim 1, wherein the first side of the seeding blade from which the fertilizer blade depends is angled outwardly from the leading edge of the seeding blade to the trailing edge of the fertilizer blade.

\* \* \* \* \*